United States Patent [19]
Chen

[11] Patent Number: 6,105,696
[45] Date of Patent: *Aug. 22, 2000

[54] ELECTRIC VEHICLE WITH COMBINED MOTORS OF MULTISTEP POWER OUTPUTS

[76] Inventor: Lei Chen, 403.No. 3 Hong Guang Li (1), JianShan Street, HexiDis., Tianjin, China

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,281

[22] Filed: Sep. 15, 1997

Related U.S. Application Data

[63] Continuation of application No. 08/501,076, filed as application No. PCT/CN94/00009, Feb. 5, 1994, abandoned.

[30] Foreign Application Priority Data

Feb. 6, 1993 [CN] China ................................. 93100110

[51] Int. Cl.$^7$ .................................................. B60K 1/02
[52] U.S. Cl. ..................... 180/65.1; 180/65.8; 180/69.6; 318/51
[58] Field of Search ..................... 180/214, 216, 180/65.1, 65.6, 65.8, 69.6, 65.2; 318/63, 51, 68; 477/3, 5

[56] References Cited

U.S. PATENT DOCUMENTS

| | | | |
|---|---|---|---|
| 636,023 | 10/1899 | Cravath | 180/65.1 X |
| 1,352,480 | 9/1920 | Schoepf . | |
| 2,944,830 | 7/1960 | Osborne et al. . | |
| 3,713,504 | 1/1973 | Shimer et al. | 180/65.1 |
| 3,845,368 | 10/1974 | Elco . | |
| 4,010,407 | 3/1977 | Lombard | 318/63 |
| 4,090,577 | 5/1978 | Moore . | |
| 4,099,589 | 7/1978 | Williams | 180/65.3 |
| 4,270,622 | 6/1981 | Travis | 180/69.6 X |
| 4,335,429 | 6/1982 | Kawakatsu | 180/65.2 X |
| 4,470,476 | 9/1984 | Hunt | 180/65.2 |
| 5,253,724 | 10/1993 | Prior | 180/69.6 X |
| 5,343,970 | 9/1994 | Severinsky | 180/65.2 |
| 5,549,172 | 8/1996 | Mutoh et al. | 180/65.1 |

FOREIGN PATENT DOCUMENTS

| | | | |
|---|---|---|---|
| 530826 | 12/1940 | United Kingdom | 180/65.1 |

OTHER PUBLICATIONS

Chinese language article from General Motors Corporation regarding their electric vehicle "Impact", pp. 13–16.
Chinese language article from Ford Motor Corporation regarding their electric vehicle "Ecostar", pp. 8–10.
Chinese language article from General Motors Corporation regarding their electric vehicle "Impact".
Specification of the General Motors Corporation's electric vehicle "Impact".
Kobe, Gerry, "Brace For Impact," Automotive Industries, pp. 35–38, Apr., 1990.
Jost, Kevin, "GM's PrEView Impact electric vehicle," Automotive Engineering, pp. 85–89, Feb., 1995.

*Primary Examiner*—Brian L. Johnson
*Assistant Examiner*—Michael Mar
*Attorney, Agent, or Firm*—Knobbe, Martens, Olson & Bear, LLP

[57] ABSTRACT

An energy-saving and high-efficiency electric vehicle which uses a set of accumulator batteries as a power source and is driven by multiple motors of different powers, each motor having its own circuit system and switching device. When greater resistance is encountered by the vehicle, such as when it starts or is going uphill, the large and small power motors are actuated simultaneously to provide a resultant force. After starting, when inertial force increases and resistance relatively decreases, the small power motor alone can be actuated, but the maximum r.p.m. it can impart to the driving shaft should be higher than that imparted by the large power motor. In this way it is possible to save energy, thereby lengthening the time and distance of continuous travel of the vehicle. At the same time, the vehicle is of lower cost, is convenient to drive, and does not pollute the environment.

3 Claims, 2 Drawing Sheets

ELECTRIC VEHICLE WITH COMBINED MOTORS OF MULTISTEP POWER OUTPUTS

This application is a continuation of U.S. patent application Ser. No. 08/501,076, filed Aug. 4, 1995 now abandoned, which is a 371 of PCT/CN94/00009 filed Feb. 5, 1994.

BACKGROUND OF THE INVENTION

The present invention relates to an electric vehicle for on-land transportation which is driven by multiple motors that are combined to provide multistep power outputs.

Most automobiles in current use are driven by fuel engines, which experience a great deal of mechanical loss and have low energy efficiency, thereby consuming a lot of energy and causing environmental pollution. Current electric vehicles also have low energy efficiency and consume a great deal of electricity. The power capacity of current accumulator batteries does not allow current electric vehicles to travel long distances, so that they are not very practical.

SUMMARY OF THE INVENTION

The object of the present invention is to provide a new type of electric vehicle with combined motors of multistep power outputs which is energy-saving, can travel continuously a longer distance, and does not pollute the environment.

These objects of the present invention are achieved by using a set of accumulator batteries as a power source and by using multiple combined motors with different powers to drive the electric vehicle, where each motor has its own circuit system and switching device. The motors can be switched either simultaneously or separately by using juxtaposed switching pedals. When these motors are actuated simultaneously, the greatest resultant force is produced and the maximum power output is obtained. When only the large power motor is actuated, a relatively high power output is obtained. If only the small power motor is actuated, the lowest power output is obtained. This arrangement gives the electric vehicle multistep power outputs whose number is more than that of the motors, whereby the different power output steps can be employed according to the magnitude of resistance during traveling. For example, if the electric vehicle is accelerated when it first starts moving, multiple motors are actuated simultaneously, thereby obtaining the highest power output. After accelerating, as the inertial force increases and resistance relatively decreases, the power output of the motors can be progressively reduced until finally the small power motor alone can either accelerate the electric vehicle or maintain it traveling at a constant speed. In order to make it possible for the output power of the small power motor to effectively propel the vehicle, the maximum r.p.m. imparted by the motor to the driving shafts should be higher than that imparted by the large power motor. The clutches between the motors and the driving shafts act to improve the starting performance of the vehicle, such as by reducing frictional resistance and balancing the vehicle speed.

By means of the arrangement of the present invention, it is possible to utilize inertial force sufficiently, increase energy conversion efficiency, lengthen the time and distance of continuous travel, reduce environmental pollution, lower the cost of driving, and make driving more convenient.

An embodiment of the present invention will be further described below in combination with the attached drawing.

DETAILED DESCRIPTION

Figure 1:
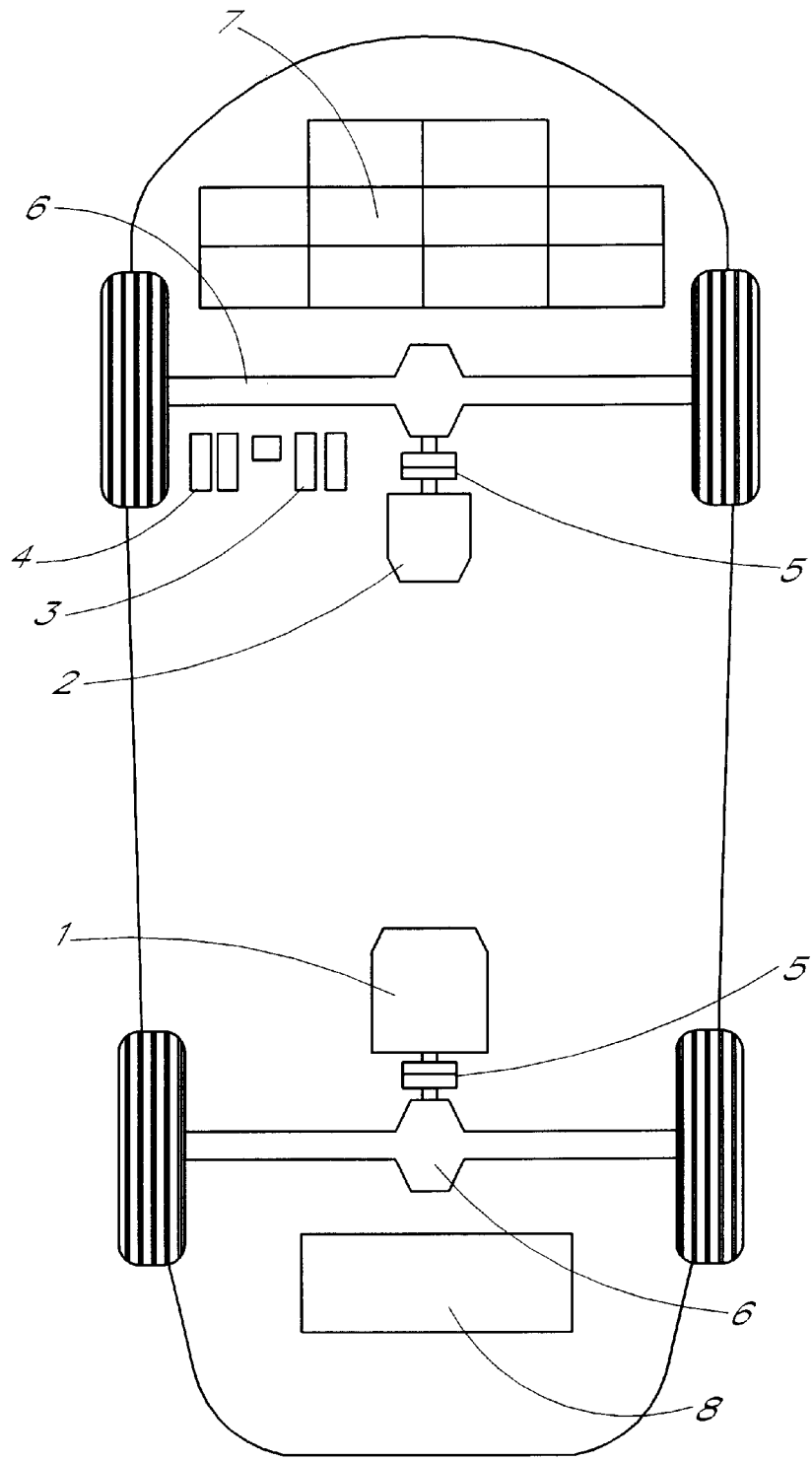
FIG. 1 illustrates a preferred embodiment of the electric vehicle.
Figure 2:
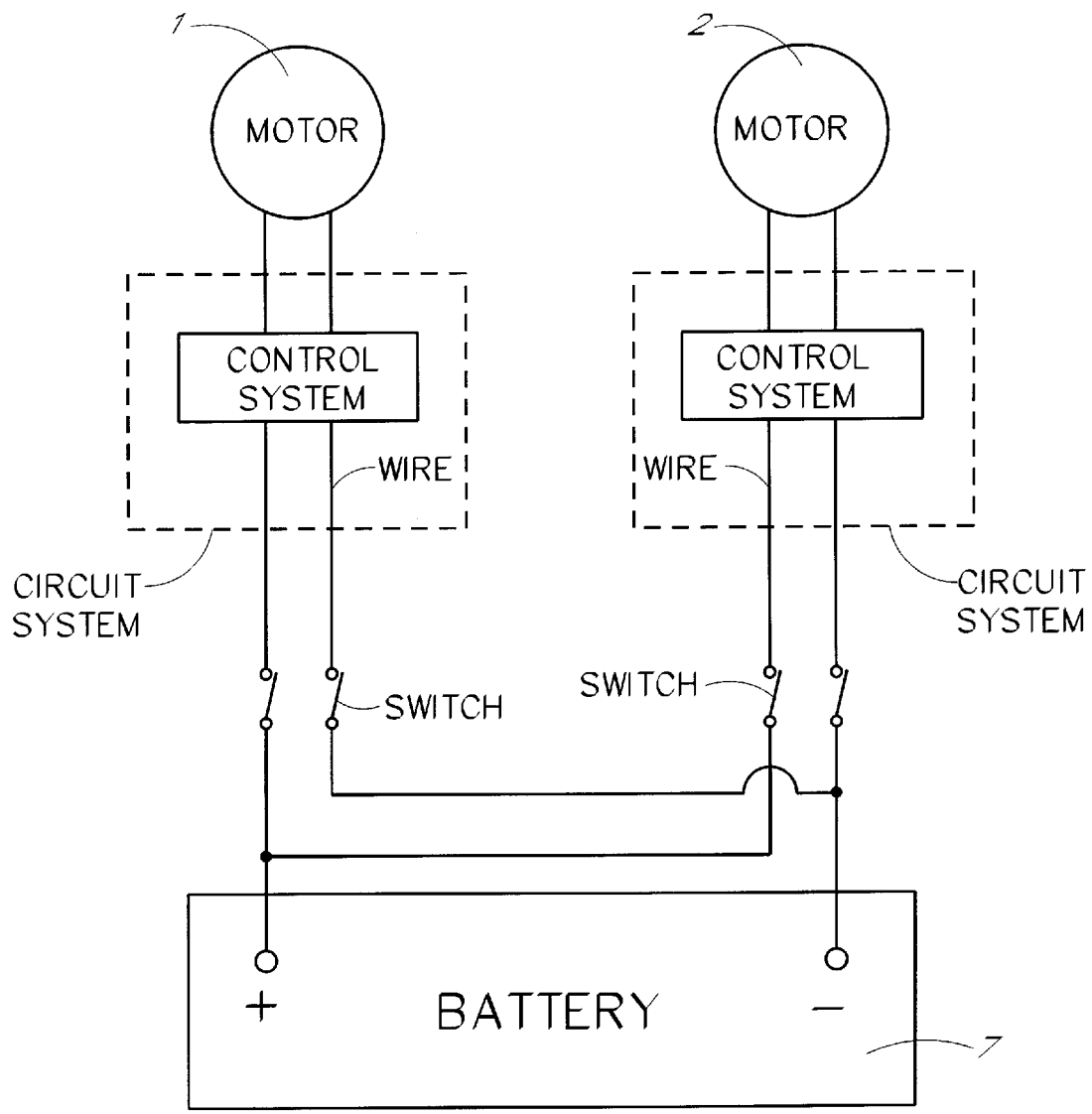
FIG. 2 illustrates the individual control systems for an electric vehicle having two electric motors.

As shown in FIG. 1, reference numeral 1 indicates a large power motor; reference numeral 2 indicates a small power motor; reference numeral 3 indicates juxtaposed motor switching pedals; reference numeral 4 indicates clutch-braking pedals; reference numeral 5 indicates clutches; reference numeral 6 indicates driving shafts; reference numeral 7 indicates a set of accumulator batteries; and reference numeral 8 indicates a charger.

The set of accumulator batteries can be charged by self-carried charger 8 of the electric vehicle when the charger is connected with a power supply, and the motors can be actuated with the set of accumulator batteries as their power source when the vehicle is traveling. The large power motor 1 and the small power motor 2 shown in the drawing each has its own circuit system and switching device. There are two juxtaposed motor switching pedals 3, which can be treaded simultaneously for switching on or which can be treaded separately. When greater resistance is encountered by the electric vehicle, such as when it first starts moving or when it travels uphill, two motors can be switched on simultaneously, the maximum power output thereby being provided by the resultant force of the two motors. As resistance decreases and, for example, only acceleration is required, the switching pedal of the large power motor can be treaded. When a certain speed is achieved during traveling and maintaining a constant speed or slow acceleration is required, the switching pedal of the small power motor can be treaded. Therefore, due to the utilization of inertial force during traveling, a better driving result can be achieved with less electricity consumption. The clutch-braking pedals 4 are the juxtaposed treadles of clutch 5 braking system between the two motors and the driving shaft, and the two clutches can be braked either simultaneously or separately.

What is claimed is:

1. An electric vehicle comprising a pair of driven shafts, a set of batteries as a power source, a plurality of electric motors of different power outputs, said plurality of electric motors including at least a small electric motor and a large electric motor, the maximum r.p.m. imparted by said small electric motor being greater than that imparted by said large electric motor and the maximum power output of said large electric motor being greater than that of said small electric motor, first and second motor switching pedals for separately or simultaneously activating and controlling said small and large electric motors respectively, first and second clutches for connecting said small and large electric motors respectively to said pair of driven shafts, and first and second clutch pedals for controlling said first and second clutches respectively, wherein activating said first and second motor switching pedals either separately or simultaneously will provide the vehicle with multistep power outputs whose number is greater than the total number of electric motors.

2. An electric vehicle comprising a plurality of separate electric motors with output shafts drivingly attached to an output shaft of the vehicle, said plurality of electric motors including at least a first electric motor and a second electric motor, the first electric motor being capable of producing a higher power output than the second electric motor, a set of accumulator batteries for supplying electric current to the plurality of electric motors, and a control system for selectively connecting the plurality of electric motors to the set of accumulator batteries, the control system including an individual control circuit and switching device associated with each one of said plurality of electric motors, the control system being configured to produce first and second power output modes by selectively activating respective switching devices of the first and second electric motors, and to produce a third power output mode by simultaneously activating both switching devices of the first and second electric motors, the power output of the second electric motor being at least sufficient to propel the electric vehicle at a constant speed.

3. The electric vehicle according to claim 2, wherein the second electric motor has a maximum rpm which is higher than that of the first electric motor.

* * * * *